United States Patent
Goade, Sr.

(10) Patent No.: US 6,688,529 B1
(45) Date of Patent: Feb. 10, 2004

(54) METHOD OF MAKING TRANSACTION CARD ASSEMBLIES

(75) Inventor: Ron E. Goade, Sr., Scottsdale, AZ (US)

(73) Assignee: Reg. Oklahoma Acquisitions, LLC, Edmond, OK (US)

(*) Notice: Subject to any disclaimer, the term of this patent is extended or adjusted under 35 U.S.C. 154(b) by 221 days.

(21) Appl. No.: 09/973,274

(22) Filed: Oct. 9, 2001

Related U.S. Application Data
(60) Provisional application No. 60/239,003, filed on Oct. 6, 2000.

(51) Int. Cl.[7] .............................................. G06K 19/02
(52) U.S. Cl. .......................... 235/488; 235/380; 283/81
(58) Field of Search ................................ 235/380, 487, 235/488; 283/62, 78, 81, 100, 104, 904; 428/40.1, 42.2, 43; 229/92.8; 156/60, 277

(56) References Cited

U.S. PATENT DOCUMENTS

| | | | |
|---|---|---|---|
| 4,978,146 A | | 12/1990 | Warther et al. |
| 4,995,642 A | * | 2/1991 | Juszak et al. ................ 283/105 |
| 5,495,981 A | | 3/1996 | Warther |
| 5,720,158 A | | 2/1998 | Goade, Sr. |
| 5,746,450 A | * | 5/1998 | Petkovsek ..................... 283/61 |
| 5,769,457 A | | 6/1998 | Warther |
| 6,010,159 A | | 1/2000 | Warther |
| 6,092,841 A | * | 7/2000 | Best et al. ..................... 283/56 |
| 6,235,139 B1 | * | 5/2001 | Vichinsky et al. .......... 156/219 |

FOREIGN PATENT DOCUMENTS

| | | | | |
|---|---|---|---|---|
| GB | 2213770 A | * | 8/1989 | ........... B42D/15/02 |

* cited by examiner

*Primary Examiner*—Diane I. Lee
(74) *Attorney, Agent, or Firm*—Dunlap Codding & Rogers

(57) ABSTRACT

A method of making a transaction card sheet product having a plurality of transaction card assemblies. Non-variable data is printed on selected portions of a sheet of material. A strip of releasable tape is applied to the sheet of material, and variable data is printed on selected portions of the sheet of material and the strip of tape. The sheet of material is laminated with a transparent material. The laminated sheet of material is cut to define the plurality of transaction card assemblies such that each transaction card assembly includes an information card having variable and non-variable data printed thereon and a corresponding tape receiving portion removably attached to the information card and having a strip of removable tape attached thereto with variable data printed thereon which corresponds to the variable data printed on the information card.

18 Claims, 4 Drawing Sheets

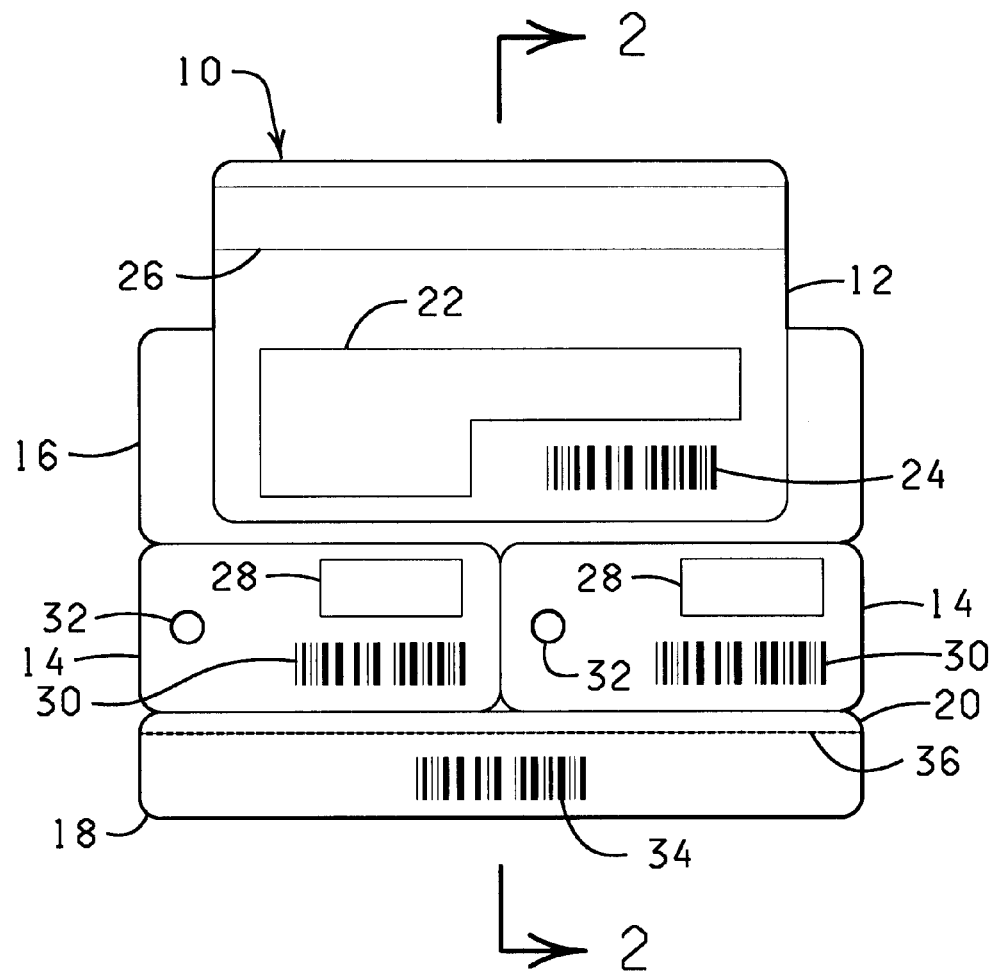
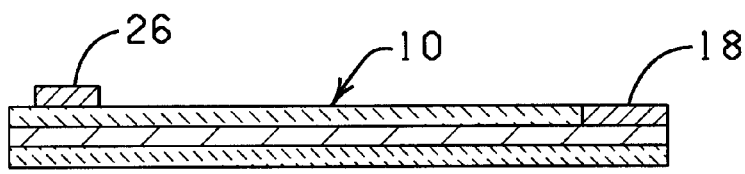

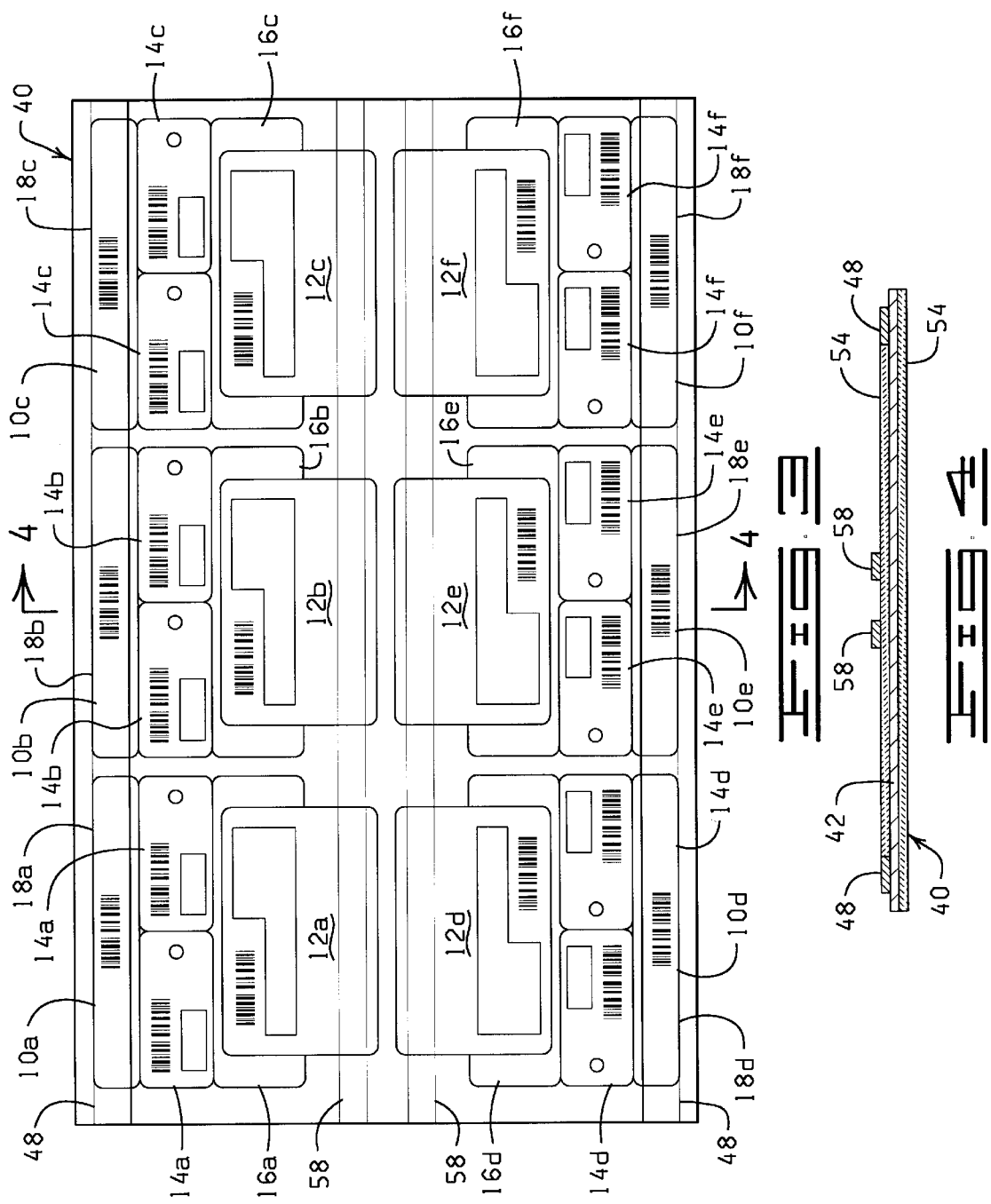

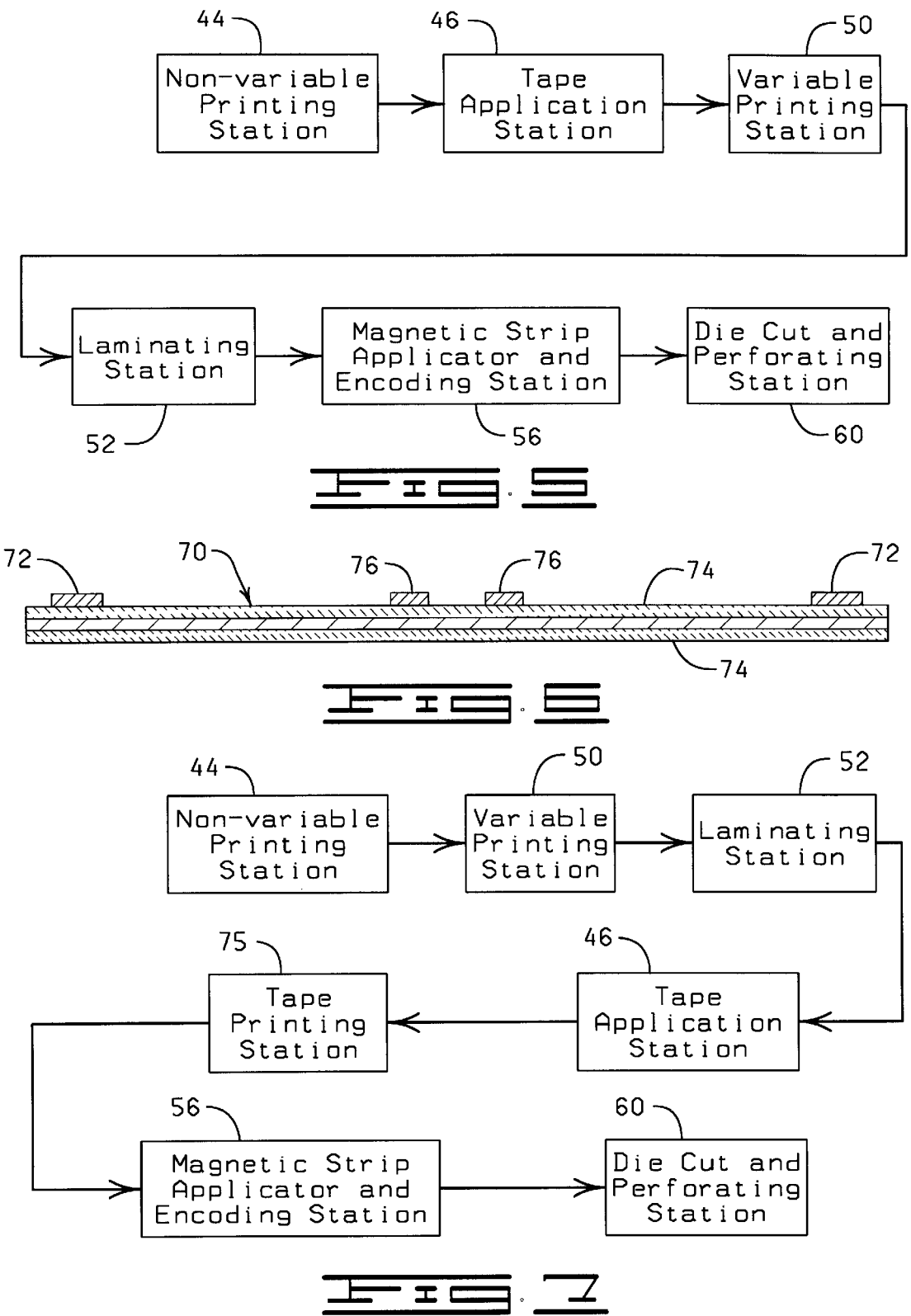

US 6,688,529 B1

METHOD OF MAKING TRANSACTION CARD ASSEMBLIES

CROSS REFERENCE TO RELATED APPLICATION

This application claims the benefit of U.S. Provisional Application Ser. No. 60/239,003, filed Oct. 6, 2000, and is expressly incorporated herein by reference.

STATEMENT REGARDING FEDERALLY SPONSORED RESEARCH OR DEVELOPMENT

Not applicable

BACKGROUND OF THE INVENTION

1. Field of the Invention

This invention relates generally to a transactional control system and more particularly, but not by way of limitation, to an improved method of making transaction card assemblies wherein each transaction card assembly includes a piece of reusable, printable tape that can be removed from the transaction card assembly and applied to an application form.

2. Brief Description of the Related Art

A substantial market has developed in recent years for inexpensively manufactured, individually encoded, transaction cards which are used as credit and debit cards, membership cards, promotional cards, I.D. cards, and the like. Such transaction cards commonly bear a registration code in the format of a bar code to permit machine scanning of the card, an alphanumeric code, or both. Such cards may be supplied as a set with one or more labels adjoining the card and bearing the same individual code number as the card. The labels are adapted for attachment to application forms, membership lists and the like.

One problem with the above system is that the manufacturing process to provide such sets requires many steps. For example, one process known in the art is a multiple step process in which individual sheets of uniquely encoded transaction cards, and labels with the same unique codes as the cards, are printed separately. Subsequently, the labels with appropriate codes are attached to each sheet adjoining the like-coded cards. Thus, the process requires several labor intensive steps including identifying the appropriate label, applying the label to the sheet to properly adjoin the associated card, and checking the final product for accuracy. In addition, because the transaction card and labels must be printed separately, if the same printer is used to print the transaction card and the labels, more printing time is required. Alternatively, several printers must be used to simultaneously print the card and labels.

Accordingly, a need exists for an improved method of making a transaction card assembly which reduces the number of steps and thus the costs associated with making the transaction card assembly. It is to such a method that the present invention is directed.

BRIEF DESCRIPTION OF THE SEVERAL VIEWS OF THE DRAWINGS

FIG. 1 is a bottom plain view of a transaction card assembly constructed in accordance with the present invention.

FIG. 2 is a cross sectional view taken along line 2—2 of FIG. 1.

FIG. 3 is a bottom plan view of a transaction card sheet product containing a plurality of transaction, card assemblies constructed in accordance with the present invention.

FIG. 4 is a cross sectional view taken along line 4—4 of FIG. 3.

FIG. 5 is a block diagram of the method used to construct the transaction card sheet product of FIGS. 3 and 4.

FIG. 6 is a cross sectional view of another embodiment of a transaction card sheet product containing a plurality of transaction card assemblies constructed in accordance with the present invention.

FIG. 7 is a block diagram of the method used to construct the transaction card sheet product of FIG. 6.

DETAILED DESCRIPTION OF THE INVENTION

Figure 8:
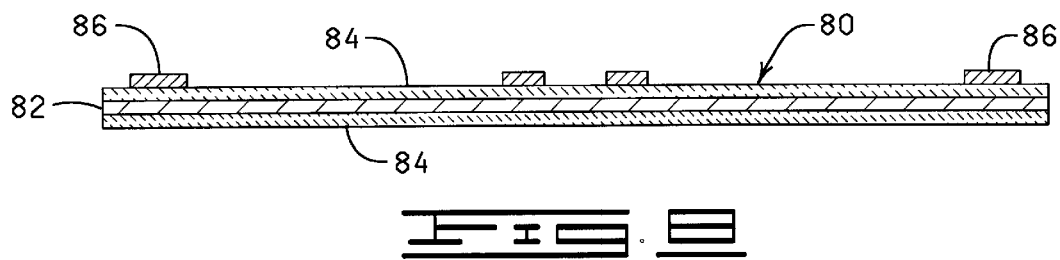
FIG. 8 is a cross sectional view of another embodiment of a transaction card sheet product containing a plurality of transaction card assemblies constructed in accordance with the present invention.

Referring now to the drawings, and more particularly to FIGS. 1 and 2, a transaction card assembly 10 constructed in accordance with the present invention is shown. The transaction card assembly 10 includes an information card 12, such as a membership card or an identification card, a pair of tag elements 14, a connecting portion 16 which integrally attaches the information card 12 to the tag elements 14, and a strip of removable tape 18 extending across a tape receiving portion 20.

The information card 12 is a generally rectangular and includes fixed or non-variable data represented by the area denoted by the reference numeral 22. Such non-variable data 22 may include art work and/or instructional information as to how to use the information card 12. The information card 12 is further provided with unique or variable data shown herein to be in the form of a bar code 24. However, the variable data 24 can also be in the form of a customer's name and mailing address and in the form of a magnetic stripe denoted in FIG. 1 by reference numeral 26.

The tag elements 14 also may include non-variable data as denoted by reference numeral 28. This may or may not be identical to the non-variable data 22 of the information card 12. Likewise, the tag elements 14 may include variable data as denoted by reference numeral 30 which corresponds with the variable data 24 of the information card 12. The removable tag elements 14 are preferably generally rectangularly shaped and smaller than the information card 12. The tag elements 14 are scored to define an opening 32 to permit the tag elements 14 to be used as a key tag lying flat and parallel with keys on a key chain or ring.

It should be understood that the information card 12 and the tag elements 14 can be formed in a variety of shapes and sizes and that the number of both the information card 12 and the tag elements 14 can be varied. For example, a transaction card assembly may include only an information card and no tag elements.

The connecting portion 16 (also known as a "gutter") is configured to permit the magnetic stripe 26 of the information card 12 to be encoded without having to first remove the information card 12 from the transaction card assembly 10 which the information card 12 is displayed. That is, the connecting portion 16 is configured such that the information card 12 has a portion projecting from the connecting portion 16. The magnetic stripe 26 of the information card 12 extends transversely across the portion of the card projecting from the connecting portion 16 whereby the information card 12 may be swiped through an encoding device (not shown) without removing the information card 12 from the card connecting portion 16.

The strip of removable tape 18 includes variable data as denoted by reference numeral 34 which corresponds with the variable data 24 of the information card 12 and the variable data 30 of the tag elements 14. The strip of removable tape 18 can be selectively removed from the tape receiving portion 20 and applied to an application or membership form to identify the person receiving the corresponding information card 12 and tag elements 14. The end user may then remove the tape receiving portion 20 via perforations 36.

The preferred method of manufacturing the transaction card assembly 10 is as a sheet product which includes a plurality of transaction card assemblies. More specifically, FIGS. 3 and 4 illustrate a transaction card sheet product 40 constructed in accordance with the present invention that includes a plurality of, transaction card assemblies 10a–10f. Each transaction card assembly 10a–10f is similar to the transaction card assembly 10 described above with the exception that the variable data on information cards 12a–12f, tag elements 14a–14f, and strips of tape 18a–18f are unique for each transaction card assembly 10a–10f.

The transaction card sheet product 40 is formed by first passing a sheet of material 42 (FIG. 4) through a non-variable printing station 44 (FIG. 5) where the non-variable data of the transaction card assemblies 10a–10f, such as art work, any instructional data and promotional information is printed on selected areas of the sheet of material 42. It will be appreciated that non-variable data can be printed on each side of the sheet of material 42.

The sheet of material 42 is next passed through a tape application station 46 (FIG. 5) where a pair of lengths of tape 48 are applied along the length of the sheet of material 42 adjacent to the longitudinal edges of the sheet of material 42. The tape receiving portion can be designated to be along any portion of the length of the sheet of material 42 that is not designated to define the information cards 12a–12f or the tag elements 14a–14f. More specifically, the lengths of tape 48 can be applied to the sheet of material 42 along an area outwardly adjacent to where the tag elements 14a–14f are designated to be formed, as illustrated in FIG. 3, or the lengths of tape 48 can be applied to the sheet of material 42 at an area inwardly adjacent to where the information cards 12a–12f are designated to be formed. Any tape can be used so long as the tape is a laser printable, transferable tape. A suitable tape applicator is available from 3M Company, model no. T646.

The sheet of material 42 is next passed through a variable printing station 50 (FIG. 5) where the variable data, which is illustrated herein as being bar codes is printed on selected portions of the sheet of material 42 corresponding to where the information cards 12a–12f and the tag elements 14a–14f will be formed and on corresponding portions of the lengths of tape 48.

After the variable data has been printed on the sheet of material 42 and the lengths of tape 48, the sheet of material 42 is passed through a laminating station 52 where each side of the sheet of material 42 is laminated with a plastic material 54 so as to laminate the portions of the sheet of material 42 that will define the information cards 12a–12f and the tag elements 14a–14f. The side of the sheet of material 42 on which the lengths of tape 48 are disposed is zone laminated so that the lengths of tape 48 remain exposed to permit their removal from the sheet of material 42 when desired. The opposite side of the sheet of material 42 is illustrated in FIG. 3 as being completely laminated.

If applicable, the laminated sheet of material 42 is next passed through a magnetic strip applicator and encoding station 56 to apply a pair magnetic strips 58.

The laminated sheet of material 42 is then passed through a die cut and perforating station 60 where the laminated sheet of material 42 is die cut to define the transaction card assemblies 10a–10f. The sheet of material 42 is die cut such that the information cards 12a–12f and tag elements 14a–14f remain integrally formed with connecting portions 16a–16f while being selectively detachable therefrom.

The sheet of material 42 of the transaction card sheet product 40 can be any thin sheet or web material having two major planar opposing sides, which can be printed upon. Preferably, the sheet of material 42 is a flexible material which can be used with conventional, high speed, offset printing machines. Acceptable materials include metal foils, cellulose based products, fabrics, cloths and preferably plastics including, for example, ABS, acetates, butyrates, phenolics, polycarbonates, polyesters, polyethylenes, polypropylenes, polystyrenes, polyurethanes and polyvinyl chlorides as monomers, copolymers and/or laminates. For example, the following specific trademarked products may be useful: Polyart I and II of Arjobex Synthetic Papers, various grades of GP700 from Bexford Limited (Engl.); Kapton, Tedlar and Telar of DuPont; Fascal, Fasprint and Crack n' Peel Plus of Fasson; Lasercal, Compucal II and Datacal Coating of Flexcon; Kimdura of Kimberly Clark; various grades of Pentapring PR of Klockner Pentaplast; various grades of LLM-LV and Data Graphic II LLM of Lamart; Teslin of PPG Industries; the following products of Stanpat: APL-100, -110, -120, -150, -200, UM-546, UC-546, PPC-410, -450 and -460; and the following products of Transilwrap: Proprint, Transilprint, Transilmatte, T.X.P., Eve, TransAlley, Transglaze, Trans-AR, Trans V.L. and T print; and others. These brand name products are treated or constructed in some fashion to make them more particularly suited for use in one or more types of printing processes. Details regarding these products and companies and others are available to those of ordinary skill in the art through various sources including but not limited to published references such as *AUTOMATED ID NEWS 1993–1994 REFERENCE GUIDE AND DIRECTORY*, published and distributed by Advanstar Communications, Cleveland, Ohio.

The plastic material 54 for laminating can be any material which is suitably and sufficiently transparent and which can be applied to the sheet of material selected in any suitable fashion for the material(s) selected without adversely affecting the sheet of material 42 or the printing thereon. The coverings might be, for example, sheets or webs of any of a variety of transparent Transcote FG and Copolymer plastic films of Transilwrap, Inc. of Chicago, Ill., which are transparent in at least the visible and infrared light spectrums or any of a variety of similarly transparent Durafilm plastic films of Graphic Laminating, Inc. of Cleveland, Ohio. The plastic films are preferably adhered to the sheet of material with an adhesive appropriate for use with the materials selected for the core and transparent covering. Typically, polymer based adhesives are used with the exemplary plastic films identified above.

In addition, such laminate films can be obtained from various commercial sources incorporating one or more magnetic (magnetizable) stripes, of the type found on most common credit cards. Alternatively, a separate magnetic stripe can be applied to the transparent covering in a conventional manner for such materials, such as by hot stamping.

For the particular tag elements being made in the preferred embodiments disclosed in this application, namely, transaction size elements such as cards, key tags and fobs and labels, the above-identified coverings are preferred, as they provide a layer of polyester having good strength, wear and soil resistant properties which can be used on the outer side of the product.

The tape used may be any conventional, commercially available, tape for use with the particular materials selected for the sheet product. For the embodiments being described, laser printable adhesive transfer tape is suitable.

The static graphic fields are printed on each selected side of the sheet of material selected. Any known, conventional type of printer and printing process may be used including, for example, flexographic, offset litographic, silkscreen, letter press, thermal transfer, thermal direct, ink jet, color laser, formed character impact, hot stamp, elctrostatic, ion deposition, magnetographic, dot matrix, cycolor, photographic silver halide, sublimation, diffusion, pad, gravure, spray painting, dyeing, elctrolytic plating, electroless plating, sputter deposition, inmold decorating, flocking, embossing, vacuum evaporation metallizing, engraving, hot transfer, electrophotographic printing or electro ink printing process. Preferably, a high speed printing process such as flexographic or offset lithography is used to print on continuous webs of thin flexible planar material for efficiency and cost. A printing method and machine capable of simultaneously printing the first and second sets of static graphic fields on the first and second sides of the sheet of material in one pass through the printer is preferred for efficiency, but single side printing in separate passes may be preferred for quality.

The variable data is printed with a programmable printer capable of printing variable data fields in at least bar and character format on at least one side of the sheet of material 42, in a single pass of the sheet of material through that printer. "Character" encompasses at least alphanumerics and conventional punctuation symbols. Commercially available printers having this capability include thermal transfer, thermal direct, ink jet, color laser, formed character impact, electrostatic, ion deposition, magnetographic, dot matrix, photographic and sublimation and are available from almost an innumerable list of suppliers. Again, printers printing on continuous webs are preferred for efficiency but printers printing on individual sheets (cut lengths of web) are preferred for quality. Currently, thermal transfer and laser printers are preferred in the industry for variable format printing, particularly of characters and bar codes. Generally speaking, existing thermal transfer printers provide high quality, sharp characters and bars while laser printers provide characters which are not as sharp but more consistent in thickness. Improvements continue to be made to both ink jet and ion deposition printers as well. Ink jet and/or ion deposition printers may be preferred for speed. However, at least currently available machines, generally speaking, do not provide the quality provided by currently available thermal transfer and laser printers. Currently, laser printing is preferred for the particular embodiments being described. For example, laser printers are made and/or distributed in the United States by such well-known corporations as Hewlett-Packard, IBM, Kodak, NCR, Panasonic, Pentax, Ricoh, Siemans, Toshiba and Xerox. In addition, literally dozens of other, smaller manufacturers offer programmed or programmable printers which can be used or can be configured to be used to perform the steps indicated above. Again, the material selected for the sheet of material 42 should be compatible with the preferred printing method and equipment or the printing methods and equipment selected to be compatible with a preferred material.

Separate printing of static graphic and variable data fields is presently preferred for speed, cost and quality. However, the capabilities of programmable printers continues to improve in all three categories. In some instances, it is already possible to simultaneously print certain types of static graphic and variable data fields at the same time using the same programmable printer in a single pass of the core through the printer. Duplex printers are now becoming available which permit the printing of variable data fields on both sides of a core in a single pass through such printers. Sheet products printed by such devices are intended to be encompassed by the present invention. The present invention is also intended to cover all instances where static graphic fields may be printed before, after or simultaneously with the variable data fields on one or both sides of a continuous or cut length sheet of material.

FIGS. 6 and 7 illustrate another method making a transaction card sheet product 70 constructed in accordance with the present invention. The transaction card sheet product 70 is similar to the transaction card sheet product 40 described above with the exception that lengths of tape 72 are applied to one of the plastic laminations 74 and in turn printed as a separate step by reading the variable data on the information card which was printed prior to lamination and passing the laminated sheet of material through a tape printing station 75. In this embodiment, the lengths of tape 72 can be applied along any portion of the laminated sheet of material that is not designated to receive additional variable information, such as in the form of magnetic stripes 76.

Figure 9:
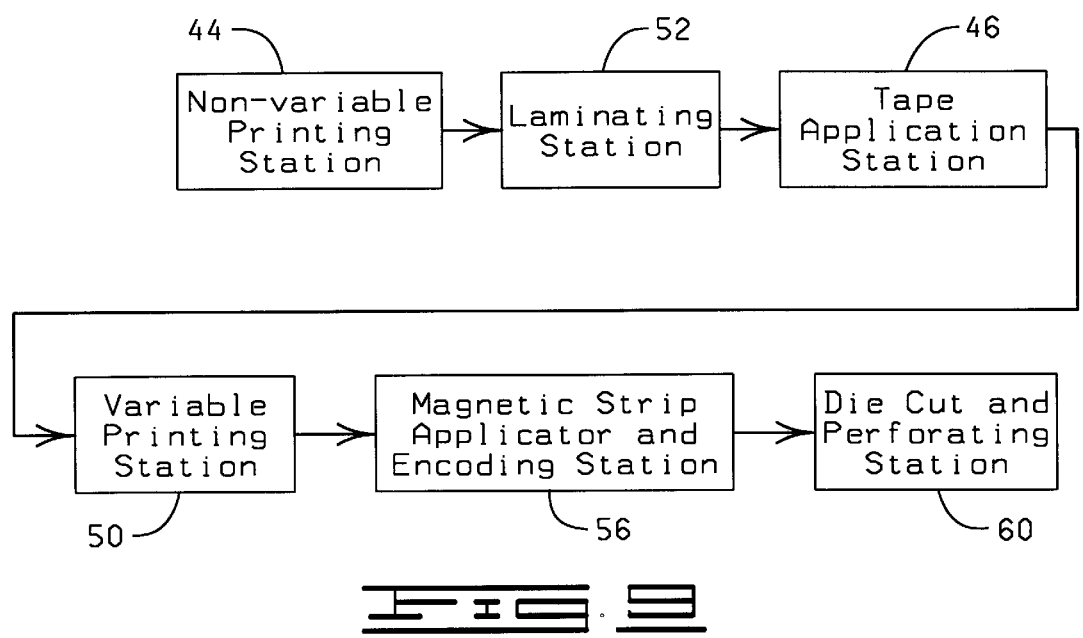
FIG. 9 is a block diagram of the method used to construct a transaction card assembly of FIG. 8.

FIGS. 8 and 9 illustrate another method of making a transaction card sheet product 80 constructed in accordance with the present invention. In this embodiment, a sheet of material 82 is first printed with non-variable data. The sheet of material 82 is then laminated with a transparent material 84 and continuous strips of tape 86 applied to the laminated sheet of material 82. The laminated sheet of material 82 is then die cut, to form the individual transaction card assemblies. Next, variable data is printed on selected portions of the laminate and selected portions of the lengths of tape. Such printing on a laminated material is typical performed with an ink jet printer.

It will be clear, that the present invention is well adapted to carry out the objects and to attain the advantages mentioned, as well as those inherent therein. While presently preferred embodiments of the invention have been described for the purposes of this disclosure, numerous changes, can be made which will readily suggest themselves to those skilled in the art and which are encompassed within the spirit of the invention disclosed herein.

What is claimed is:

1. A method of constructing a transaction card sheet product having a plurality of transaction card assemblies, the method comprising the steps of:

providing a sheet of material;

printing non-variable data on selected portions of the sheet of material;

applying a strip of releasable tape to the sheet of material;

printing variable data on selected portions of the sheet of material and the strip of tape;

laminating the sheet of material with a transparent material so as to cover the variable and non-variable data printed on the sheet of material while permitting the strip of tape to be selectively removed from the sheet of material; and cutting the laminated sheet of material to define the plurality of transaction card assemblies such that each transaction card assembly includes an information card having variable and non-variable data printed thereon and a corresponding tape receiving portion removably attached to the information card and having a strip of removable tape attached thereto with variable data printed thereon which corresponds to the variable data printed on the information card.

2. The method of claim 1 wherein the cutting step further comprises cutting the laminated sheet of material to define a plurality of tag elements removably attached to the information card and having variable and non-variable data printed thereon, the variable data of each of the tag elements corresponding to the variable data of the information card and the strip of tape.

3. The method of claim 1 wherein the strip of tape is applied to the sheet of material adjacent to one of the longitudinal edges of the sheet of material along substantially the entire length of the sheet of material.

4. The method of claim 3 wherein the step of applying the strip of tape further comprises applying another strip of removable tape adjacent to the opposing longitudinal edge of the sheet of material along substantially the entire length of the sheet of material.

5. The method of claim 4 wherein the strips of tape are applied to the sheet of material simultaneously.

6. The method of claim 1 further comprising applying a magnetic strip to the laminated sheet prior to cutting the laminated sheet of material.

7. A method of constructing a transaction card sheet product having a plurality of transaction card assemblies, the method comprising the steps of:

providing a sheet of material;

printing variable and non-variable data on selected portions of the sheet of material;

laminating the sheet of material with a transparent material so as to cover the variable and non-variable data printed on the sheet of material;

applying a strip of releasable tape to the laminated sheet of material;

reading the variable data printed on the laminated sheet of material;

printing variable data on selected portions of the strip of tape in response to reading the variable data printed on the laminated sheet of material; and cutting the laminated sheet of material to define the plurality of transaction card assemblies such that each transaction card assembly includes an information card having variable and non-variable data printed thereon and a corresponding tape receiving portion having a strip of removable tape attached thereto with variable data printed thereon which corresponds to the variable data printed on the information card.

8. The method of claim 7 wherein the cutting step further comprises cutting the laminated sheet of material to define a plurality of tag elements removably attached to the information card and having variable and non-variable data printed thereon, the variable data of each of the tag elements corresponding to the variable data of the information card and the strip of tape.

9. The method of claim 7 wherein the strip of tape is applied to the laminated sheet of material adjacent to one of the longitudinal edges of the laminated sheet of material along substantially the entire length of the laminated sheet of material.

10. The method of claim 9 wherein the step of applying the strip of tape further comprises applying another strip of removable tape adjacent to the opposing longitudinal edge of the laminated sheet of material along substantially the entire length of the laminated sheet of material.

11. The method of claim 10 wherein the strips of tape are applied to the sheet of material simultaneously.

12. The method of claim 7 further comprising applying a magnetic strip to the laminated sheet prior to cutting the laminated sheet of material.

13. A method of constructing a transaction card sheet product having a plurality of transaction card assemblies the method comprising the steps of:

providing a sheet of material;

printing non-variable data on selected portions of the sheet of material;

laminating the sheet of material with a transparent material so as to cover the variable data printed on the sheet of material;

applying a strip of releasable tape to the laminated sheet of material;

printing variable data on selected portions of the laminated sheet of material and the strip of tape; and cutting the laminated sheet of material to define the plurality of transaction card assemblies such that each transaction card assembly includes an information card having variable and non-variable data printed thereon and a corresponding tape receiving portion removably attached to the information card and having a strip of removable tape attached thereto with variable data printed thereon which corresponds to the variable data printed on the information card.

14. The method of claim 13 wherein the cutting step further comprises cutting the laminated sheet of material to define a plurality of tag elements removably attached to the information card and having variable and non-variable data printed thereon, the variable data of each of the tag elements corresponding to the variable data of the information card and the strip of tape.

15. The method of claim 13 wherein the strip of tape is applied to the laminated sheet of material adjacent to one of the longitudinal edges of the laminated sheet of material along substantially the entire length of the laminated sheet of material.

16. The method of claim 14 wherein the step of applying the strip of tape further comprises applying another strip of removable tape adjacent to the opposing longitudinal edge of the laminated sheet of material along substantially the entire length of the laminated sheet of material.

17. The method of claim 15 wherein the strips of tape are applied to the sheet of material simultaneously.

18. The method of claim 13 further comprising applying a magnetic strip to the laminated sheet prior to cutting the laminated sheet of material.

* * * * *